US012356128B2

(12) United States Patent
Mao et al.

(10) Patent No.: US 12,356,128 B2
(45) Date of Patent: Jul. 8, 2025

(54) MULTIFUNCTIONAL SOUND DEVICE

(71) Applicant: AAC Technologies (Nanjing) Co., Ltd., Nanjing (CN)

(72) Inventors: Lubin Mao, Nanjing (CN); Jie Ma, Nanjing (CN); Yun Tang, Nanjing (CN); Ziang Li, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 255 days.

(21) Appl. No.: 18/337,414

(22) Filed: Jun. 19, 2023

(65) Prior Publication Data

US 2024/0205576 A1 Jun. 20, 2024

Related U.S. Application Data

(63) Continuation of application No. PCT/CN2022/144407, filed on Dec. 31, 2022.

(30) Foreign Application Priority Data

Dec. 19, 2022 (CN) ......................... 202223407591.3

(51) Int. Cl.

*H04R 1/02* (2006.01)
*H04R 1/28* (2006.01)
*H04R 9/02* (2006.01)
*H04R 9/04* (2006.01)

(52) U.S. Cl.

CPC ............. *H04R 1/025* (2013.01); *H04R 1/283* (2013.01); *H04R 9/025* (2013.01); *H04R 9/045* (2013.01); *H04R 9/046* (2013.01); *H04R 2209/041* (2013.01)

(58) Field of Classification Search

CPC ........ H04R 1/025; H04R 1/283; H04R 9/025; H04R 9/045; H04R 9/046; H04R 2209/041

See application file for complete search history.

(56) References Cited

U.S. PATENT DOCUMENTS

2024/0195278 A1 * 6/2024 Zhang .................... H02K 33/02

FOREIGN PATENT DOCUMENTS

CN 113747310 A * 12/2021 ............. H04R 9/025

OTHER PUBLICATIONS

English machine translation of CN-113747310-A (Cai et al,; Sounding Device And Electronic Device; published December 2021) (Year: 2021).*

* cited by examiner

*Primary Examiner* — Mark Fischer
(74) *Attorney, Agent, or Firm* — Wiersch Law Group

(57) ABSTRACT

A multifunctional sound device includes a housing, a sound unit, and a motor assembly. The sound unit includes a frame, a vibration system, and a magnetic circuit system. The motor assembly includes a vibration unit and elastic components. The vibration unit includes driving coils and a mass block. The driving coils are fixed to the mass block and located in a magnetic field range of the magnetic circuit system. The mass block is made of conductive materials. The driving coils interact with the magnetic circuit system to enable the vibration unit to vibrate in a reciprocating mode after the driving coils are energized. Compared with related art, the multifunctional sound device is small in overall thickness and size, large in electromagnetic damping of a magnetic circuit, easy to assemble, and excellent in acoustic performance.

10 Claims, 6 Drawing Sheets

MULTIFUNCTIONAL SOUND DEVICE

TECHNICAL FIELD

The present invention relates to a field of electroacoustic conversion, and in particular to a multifunctional sound device for electronic sound box products.

BACKGROUND

Coming with mobile internet era, the number of intelligent mobile equipment continuously rises. And, among various mobile equipment, there is no doubt that mobile phones are the most common and the most portable mobile terminal equipment. At present, the mobile phones have a variety of functions, such as high-quality music function and vibration function. Therefore, multifunctional sound devices having the vibration function and sound playing function are widely applied to current intelligent mobile equipment.

The multifunctional sound devices in the related art each includes a housing, a sound unit, and a motor assembly. The sound unit and the motor assembly are accommodated in the housing. The sound unit includes a frame, a vibration system, and a magnetic circuit system. The vibration system and the magnetic circuit system are respectively fixed on the frame, and the magnetic circuit system defines a magnetic gap. The motor assembly is attached to one side, distal from the vibration system, of the magnetic circuit system. The motor assembly includes a vibration unit and elastic components. The elastic components suspend the vibration unit in an accommodation space. The multifunctional sound device further includes a damping component. The damping component is disposed on the housing and is configured to perform vibration damping when the vibration unit vibrates.

However, in the related art, the sound unit and a motor vibration system in each of the multifunctional sound devices are independently controlled. Due to a fact that the motor vibration system is stacked below the sound unit, thicknesses of the multifunctional sound devices are increased, and the multifunctional sound devices are difficult to be light and thin. Moreover, a magnet of the sound unit and a magnet of the motor vibration system are not on one plane, and respective magnetic field driving forces of the sound unit and the motor vibration system interfere with each other and affect each other, so that there is a large number of the magnets in the multifunctional sound devices, which large in volume and is difficult for the multifunctional sound devices to achieve miniaturization, thereby resulting in poor acoustic performance and poor vibration performance of the multifunctional sound devices. In addition, in the related art, the damping component in each of the multifunctional sound devices is generally made of foams, and damping of the vibration unit is adjusted through the foams, but a process is complex and the damping is small when installing the foams as the damping component. Since a volume of the foams is large, the multifunctional sound devices are also large in size and cannot be miniaturized, resulting in the poor acoustic performance and the poor vibration performance of the multifunctional sound devices.

Therefore, it is necessary to provide a new multifunctional sound device to solve above technical problems.

SUMMARY

The present invention aims to provide a multifunctional sound device which is small in overall thickness, small in size, large in electromagnetic damping of a magnetic circuit, easy to assemble, and excellent in acoustic performance.

In order to achieve above aims, the present invention provides the multifunctional sound device, including a housing, a sound unit, and a motor assembly. The housing includes an accommodating space. The sound unit is accommodated in the accommodating space. The sound unit includes a frame, a vibration system, and a magnetic circuit system. The vibration system and the magnetic circuit system are respectively fixed to the frame. The magnetic circuit system is configured to drive the vibration system to vibrate and generate sound. The magnetic circuit system includes magnetic gaps. The motor assembly is accommodated in the accommodating space. The motor assembly includes a vibration unit and elastic components. The vibration unit is disposed on one side, distal from the vibration system, of the magnetic circuit system. The elastic components suspend the vibration unit in the accommodating space. The vibration unit includes driving coils and a mass block. The driving coils are fixed to the mass block and are located in a magnetic field range of the magnetic circuit system. The mass block is made of conductive materials. The driving coils interact with the magnetic circuit system to enable the vibration unit to vibrate in a reciprocating mode after the driving coils are energized. The mass block cuts magnetic field lines of the magnetic circuit system in reciprocating vibration of the vibration unit and generates electromagnetic damping to prevent the vibration unit from vibrating.

Optionally, the mass block is made of copper materials.

Optionally, a mounting hole is defined on the mass block and penetrates through the mass block. A position, corresponding to the mounting hole, of the housing protrudes towards the magnetic circuit system to form a protruding portion. The magnetic circuit system is fixed to the housing through the protruding portion.

Optionally, the driving coils include two driving coils. The two driving coils are respectively disposed on two opposite sides of the protruding portion along a vibration direction of the vibration unit and correspond to the magnetic gaps.

Optionally, the mass block includes a mass block body and two counterweight portions. The counterweight portions extend from the mass block body to a direction of the magnetic circuit system. The two driving coils are respectively fixed to the mass block body. The two counterweight portions are respectively located on two opposite sides, perpendicular to the vibration direction of the vibration unit, of the protruding portion.

Optionally, the multifunctional sound device further includes a supporting frame. The supporting frame is disposed between the protruding portion and the magnetic circuit system. The magnetic circuit system is fixed to the housing by sequentially passing through the supporting frame and the protruding portion.

Optionally, the elastic components comprise two elastic components. The two elastic components are respectively fixed to two opposite sides of the mass block along a vibration direction of the vibration unit.

Optionally, the magnetic circuit system includes a main magnetic circuit and an auxiliary magnetic circuit. The auxiliary magnetic circuit surrounds the main magnetic circuit and is spaced apart from the main magnetic circuit to form the magnetic gaps. The main magnetic circuit and the auxiliary magnetic circuit are respectively fixed to the supporting frame. The main magnetic circuit includes a first main magnet, a second main magnet, and a main pole core.

The second main magnet is stacked and fixed to the first main magnet. The main pole core is stacked and fixed to the second main magnet.

The auxiliary magnetic circuit includes two first auxiliary magnets, two second auxiliary magnets, and an auxiliary pole core. The two first auxiliary magnets are disposed on two opposite first sides of the first main magnet. The two second auxiliary magnets are disposed on two opposite second sides of the first main magnet. The auxiliary pole core is annular and is respectively stacked and fixed to the first auxiliary magnets and the second auxiliary magnets. A peripheral side of the auxiliary pole core is at least partially fixed to the frame.

Optionally, the auxiliary pole core includes an auxiliary pole core body and auxiliary pole core fixing portions. The auxiliary pole core body is annular. The auxiliary pole core fixing portions extend from the auxiliary pole core body to the housing and are fixed to the frame.

Optionally, the vibration system includes a vibrating diaphragm, a voice coil, a bracket, and elastic supporting components. The vibrating diaphragm is fixed to the frame. The voice coil is inserted into the magnetic gaps and drives the vibrating diaphragm to vibrate. The bracket is fixed to the vibrating diaphragm. The elastic supporting components are disposed at intervals with the vibrating diaphragm. The voice coil is suspended in the magnetic gaps through the bracket. A first end of each of the elastic supporting components is fixed to the frame. A second end of each of the elastic supporting components is fixed to the bracket.

Compared with related art, the multifunctional sound device of the present invention includes the housing, the sound unit, and the motor assembly. The housing includes the accommodating space. The sound unit and the motor assembly are accommodated in the accommodating space. The multifunctional sound device of the present invention is provided with the magnetic circuit system through the sound unit. The motor assembly includes the vibration unit and the elastic components. The vibration unit is disposed on the one side, distal from the vibration system, of the magnetic circuit system. The elastic components suspend the vibration unit in the accommodating space. The vibration unit includes the driving coils and the mass block. The driving coils are fixed to the mass block and located in a magnetic field range of the magnetic circuit system. When the driving coils are energized, the magnetic circuit system of the sound unit provides driving forces for the driving coils, so that the magnets serving as stators are not required for the motor assembly, and spaces originally for the magnets are now provided for the accommodating space, that is, the sound unit and the motor assembly share one magnetic circuit, so that the multifunctional sound device is small in overall thickness, small in size, and excellent in acoustic performance. Preferably, the mass block is made of conductive materials. The driving coils interact with the magnetic circuit system to enable the vibration unit to vibrate in a reciprocating mode after the driving coils are energized. The mass block cuts magnetic field lines of the magnetic circuit system in reciprocating vibration of the vibration unit and generates electromagnetic damping to prevent the vibration unit from vibrating. The mass block serves as the damping for providing the vibration of the vibration unit, and the electromagnetic damping of the magnetic circuit provides a larger damping compared to the damping in the related art, which optimizes methods of providing damping, saves a volume, and is easy to assemble the multifunctional sound device. Meanwhile, the structure further reduces cost of parts and assembly, and the multifunctional sound device is excellent in the acoustic performance and wide in application.

BRIEF DESCRIPTION OF DRAWINGS

In order to more clearly illustrate technical solutions in embodiments of the present invention, drawings required in description of the embodiments are briefly described below. Obviously, the drawings in the following description are merely some embodiments of the present invention. For a person of ordinary skill in art, other drawings may be obtained according to the drawings without creative efforts.

DETAILED DESCRIPTION

Figure 1:
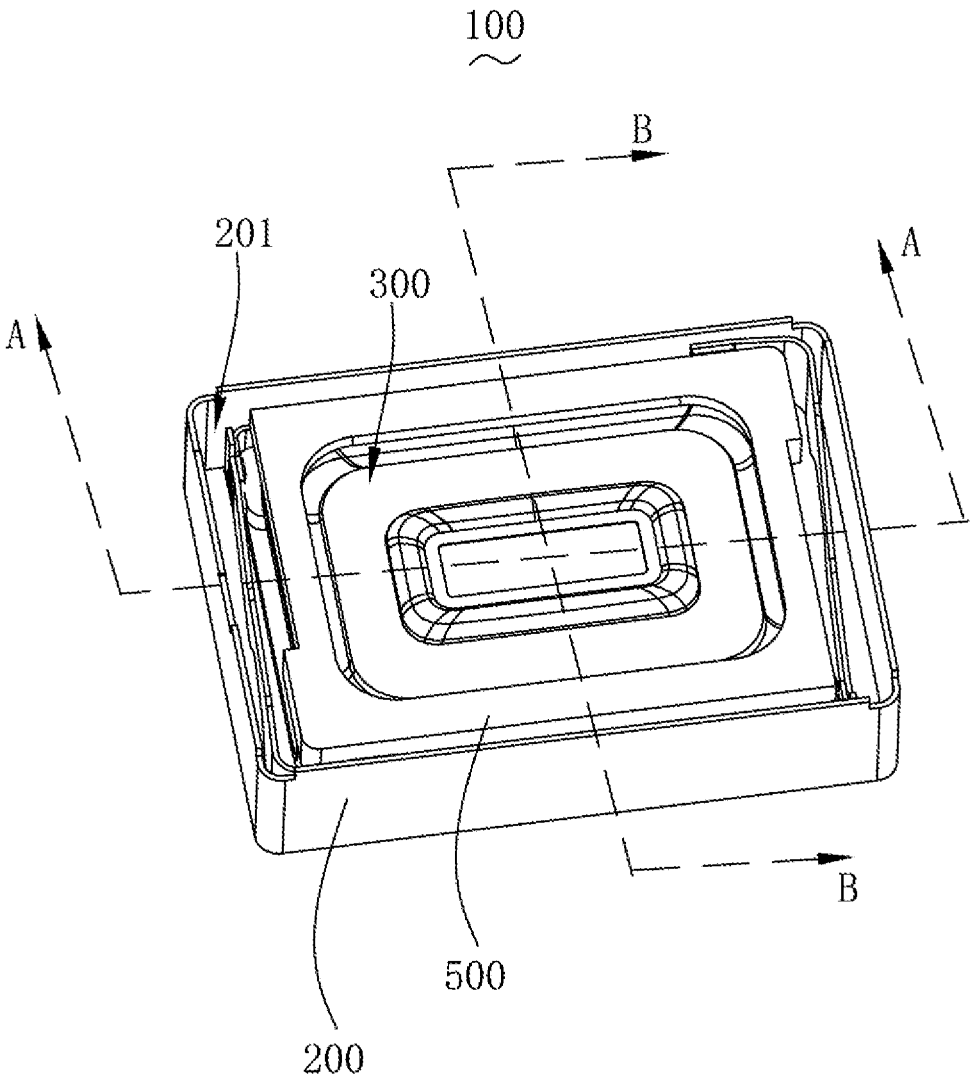
FIG. 1 is a three-dimensional structural schematic diagram of a multifunctional sound device according to one embodiment of the present invention.
Figure 2:
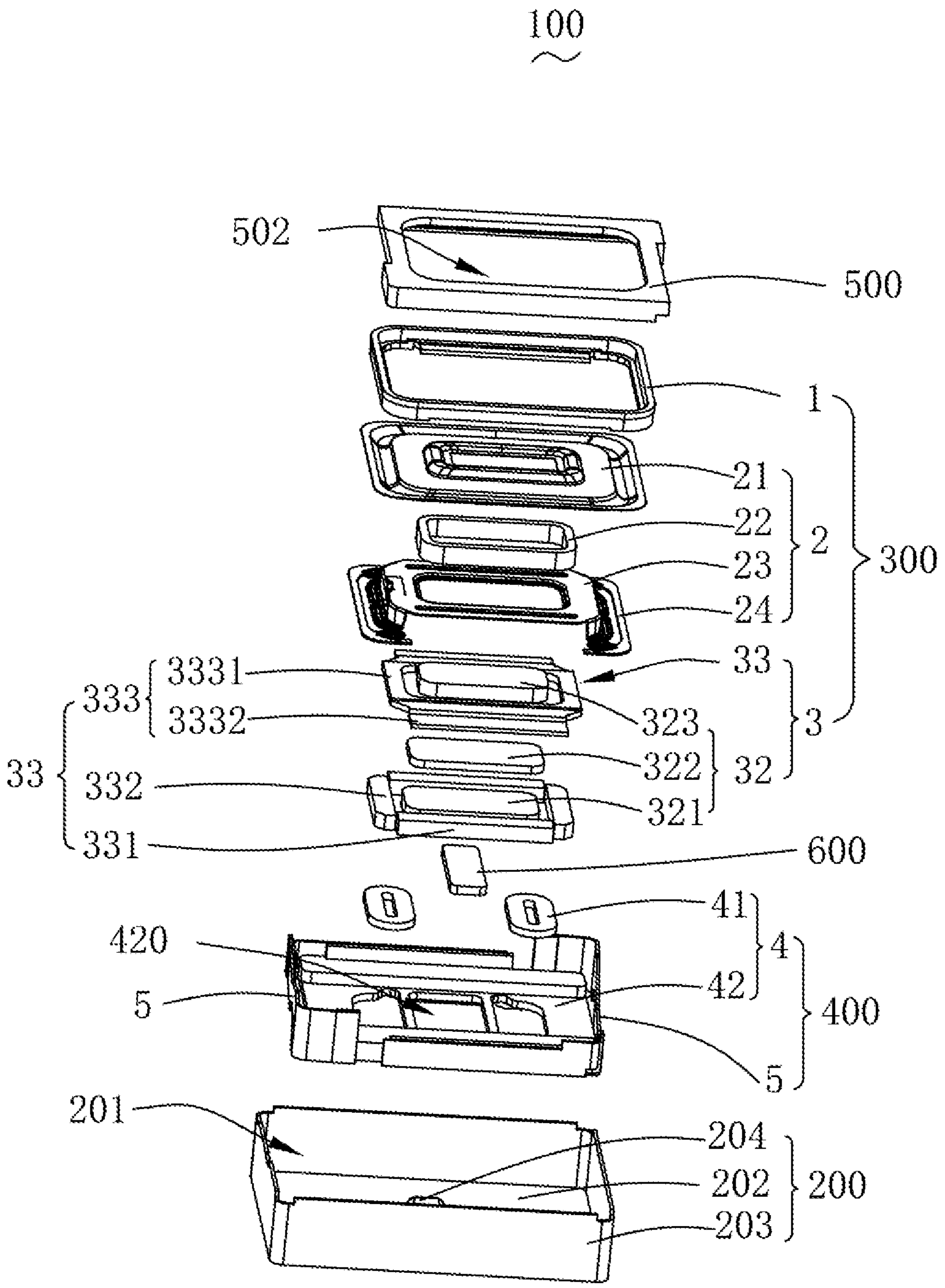
FIG. 2 is a partial exploded three-dimensional structural schematic diagram of the multifunctional sound device according to one embodiment of the present invention.
Figure 3:
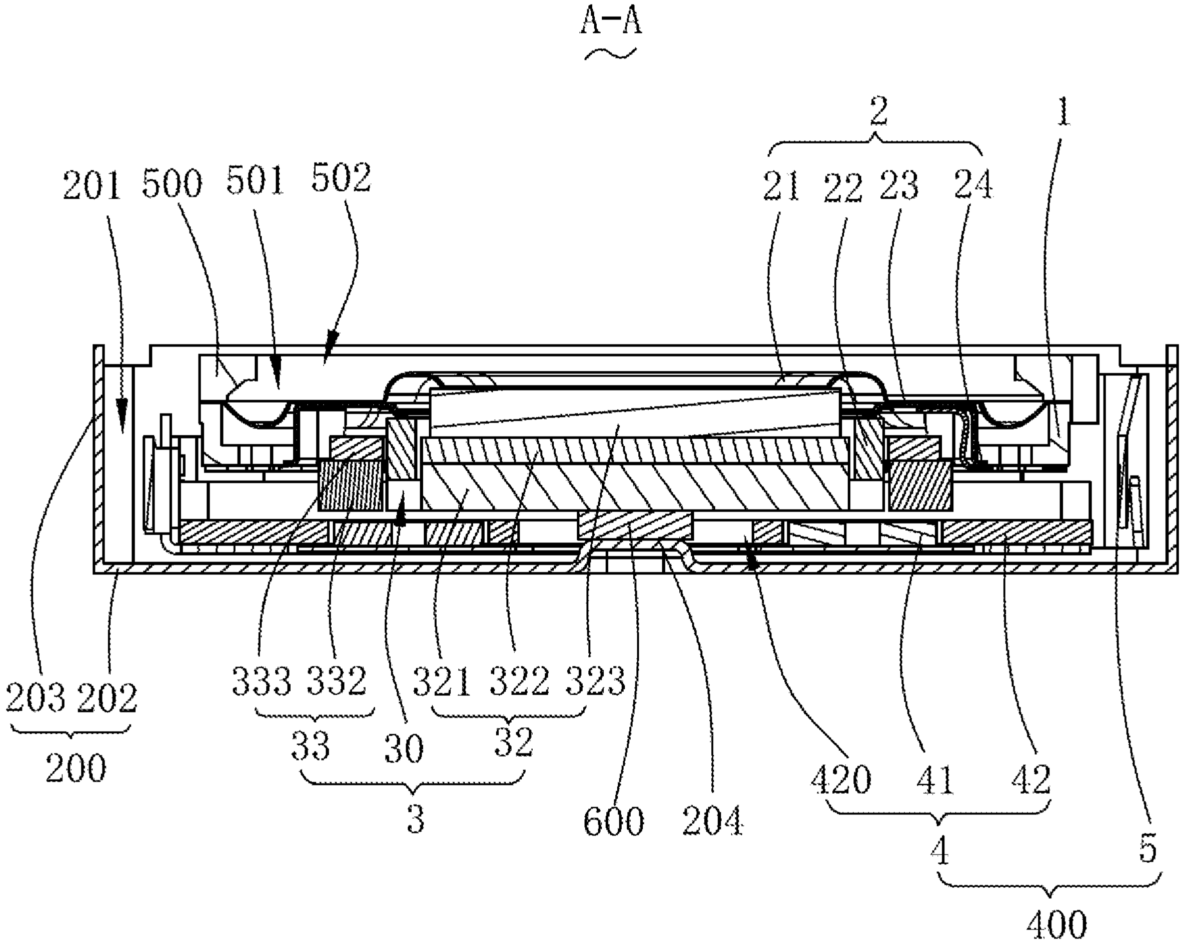
FIG. 3 is a schematic diagram of a cross-sectional view taken along the line A-A shown in FIG. 1.
Figure 4:
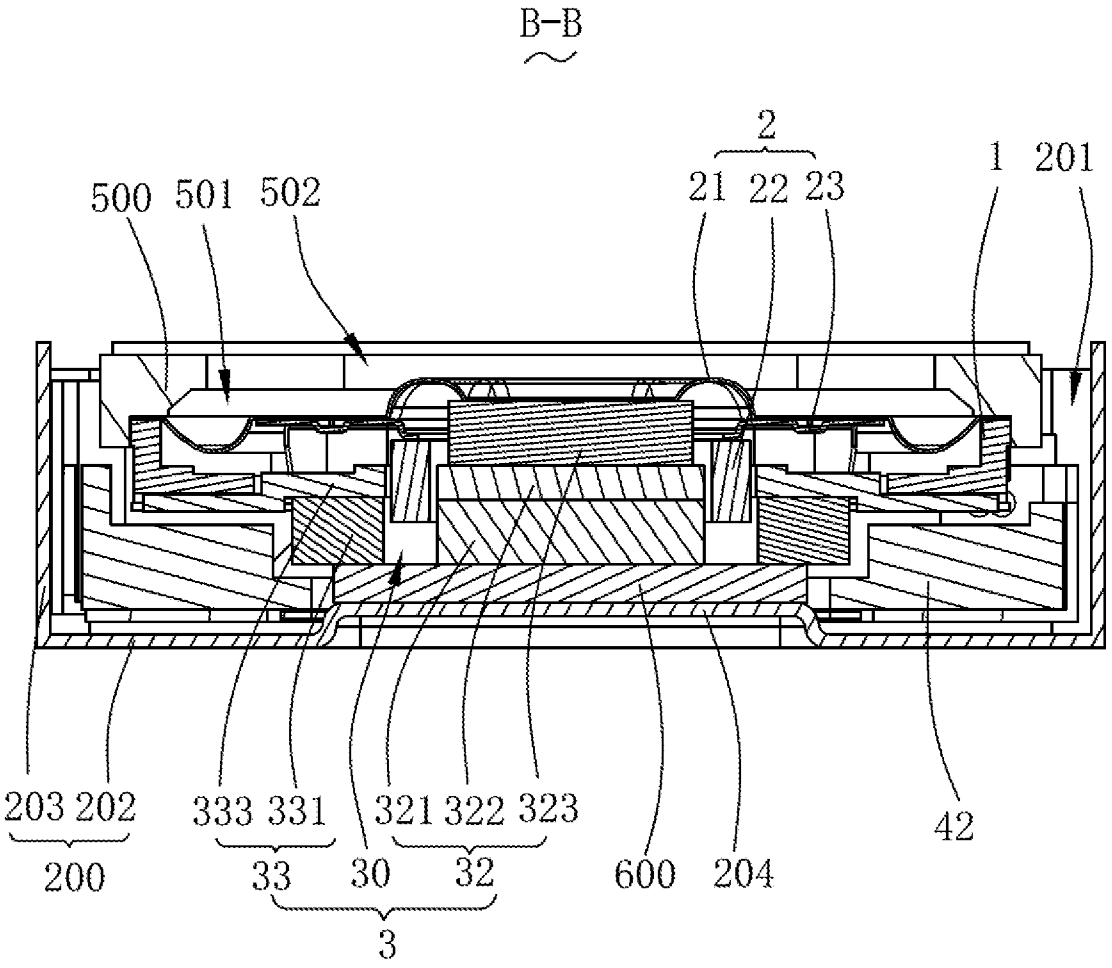
FIG. 4 is a schematic diagram of a cross-sectional view taken along the line B-B shown in FIG. 1.
Figure 5:
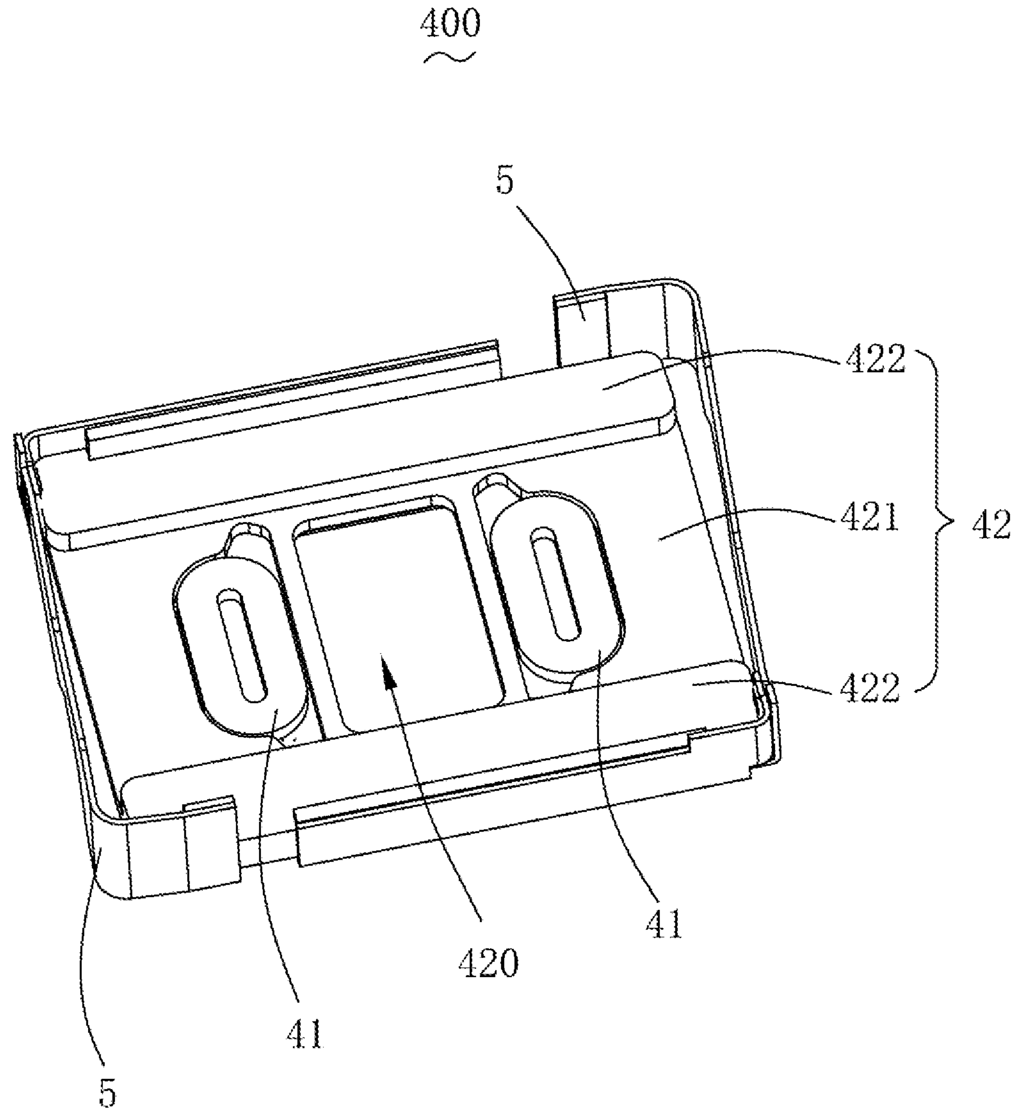
FIG. 5 is a three-dimensional structural schematic diagram of a motor assembly of the multifunctional sound device according to one embodiment of the present invention.

Technical solutions in embodiments of the present invention are clearly and completely described below with reference to accompanying drawings in the embodiments of the present invention. Obviously, the described embodiments are only a part of the embodiments of the present invention, not all of the embodiments. Based on the embodiments of the present invention, all other embodiments obtained by a person of ordinary skill in art without creative efforts shall fall within a protection scope of the present invention.

Referring to FIGS. 1-6, the present invention provides a multifunctional sound device 100.

The multifunctional sound device 100 includes a housing 200, a sound unit 300, a motor assembly 400, a front cover 500, and a supporting frame 600. The housing 200 includes an accommodating space 201. The sound unit 300, the motor assembly 400, the front cover 500, and the supporting frame 600 are accommodated in the accommodating space 201.

The housing 200 includes a base 202, a side wall 203, and a protruding portion 204. The side wall 203 is bent and extends from a periphery of the base 202. The base 202 and the side wall 203 together enclose the accommodating space 201. The protruding portion 204 is configured to fix the sound unit 300.

The sound unit 300 includes a frame 1, a vibration system 2, and a magnetic circuit system 3. The vibration system 2 and the magnetic circuit system 3 are respectively fixed to the frame 1. The magnetic circuit system 3 is configured to drive the vibration system 2 to vibrate and generate sound. The magnetic circuit system 3 includes magnetic gaps 30.

In the embodiment, the frame 1 is rectangular.

The vibration system 2 includes a vibrating diaphragm 21, a voice coil 22, a bracket 23, and elastic supporting components 24. The vibrating diaphragm 21 is fixed to the frame 1. The voice coil 22 is inserted into the magnetic gaps 30 and drives the vibrating diaphragm 21 to vibrate. The bracket 23 is fixed to the vibrating diaphragm 21. The elastic supporting components 24 are disposed at intervals with the vibrating diaphragm 21.

The voice coil 22 is suspended in the magnetic gaps 30 through the bracket 23.

A first end of each of the elastic supporting components 24 is fixed to the frame 1.

A second end of each of the elastic supporting components 24 is fixed to the bracket 23. In the embodiment, the elastic supporting components 24 include two elastic supporting components 24. The two elastic supporting components 24 are respectively located on two opposite sides of a short shaft of the frame 1. The two elastic supporting components 24 which are symmetrically distributed are more stable in supporting the voice coil 22, so that vibration reliability is better.

The magnetic circuit system 3 includes a main magnetic circuit 32 and an auxiliary magnetic circuit 33. The auxiliary magnetic circuit 33 surrounds the main magnetic circuit 32 and is spaced apart from the main magnetic circuit 32 to form the magnetic gaps 30.

The magnetic circuit system 3 is fixed to the protruding portion 204 through the main magnetic circuit 32 and the auxiliary magnetic circuit 33.

The main magnetic circuit 32 includes a first main magnet 321, a second main magnet 322, and a main pole core 323. The second main magnet 322 is stacked and fixed to the first main magnet 321. The main pole core 323 is stacked and fixed to the second main magnet 322.

The auxiliary magnetic circuit 33 includes two first auxiliary magnets 331, two second auxiliary magnets 332, and an auxiliary pole core 333. The two first auxiliary magnets 331 are disposed on two opposite first sides of the first main magnet 321. The two second auxiliary magnets 332 are disposed on two opposite second sides of the first main magnet 321. The auxiliary pole core 333 is annular and is respectively stacked and fixed to the first auxiliary magnets 331 and the second auxiliary magnets 332.

In the embodiment, the main magnetic circuit 32 is rectangular. The two first auxiliary magnets 331 are located on two opposite sides of a short shaft of the main magnetic circuit 32. The two second auxiliary magnets 332 are located on two opposite sides of a long shaft of the main magnetic circuit 32.

An outer peripheral side of the auxiliary magnetic circuit 33 is at least partially fixed to the frame 1. Specifically, the auxiliary pole core 333 includes an auxiliary pole core body 3331 and auxiliary pole core fixing portions 3332. The auxiliary pole core body 3331 is annular. The auxiliary pole core fixing portions 3332 extend from the auxiliary pole core body 3331 to the housing 200 and are fixed to the frame 1.

The auxiliary pole core fixing portions include two auxiliary pole core fixing portions 3332. The two auxiliary pole core fixing portions 3332 are located on two opposite sides of the short shaft of the main magnetic circuit 32.

The main magnetic circuit 32 and the auxiliary magnetic circuit 33 are both formed by stacking a plurality of magnets. The auxiliary magnetic circuit 33 surrounds the main magnetic circuit 32 and is spaced apart from the main magnetic circuit 32 to form the magnetic gaps 30. According to the structure, density of the plurality of the magnets on two sides of the magnetic gaps 30 is increased, so that driving force of the magnetic circuit of the magnetic gaps 30 is improved, and the multifunctional sound device 100 of the present invention has good acoustic performance.

The motor assembly 400 includes a vibration unit 4 and elastic components 5. The vibration unit 4 is disposed on one side, distal from the vibration system 2, of the magnetic circuit system 3. The elastic components 5 suspend the vibration unit 4 in the accommodating space 201.

The vibration unit 4 includes driving coils 41 and a mass block 42.

The driving coils 41 are fixed to the mass block 42 and located in a magnetic field range of the main magnetic circuit 32 and the auxiliary magnetic circuit 33.

In the embodiment, the driving coils 41 include two driving coils 41. The two driving coils 41 are respectively disposed on two opposite sides of the protruding portion 204 along a vibration direction of the vibration unit 4 and correspond to the magnetic gaps 30.

The mass block 42 is configured to balance weight of the vibration unit 4, thereby further increasing weight of the vibration unit 4, so that vibration amplitude of the vibration unit 4 is improved, and the motor assembly 400 outputs a higher acceleration, which improves vibration performance and vibration effect of the multifunctional sound device 100 of the present invention.

A mounting hole 420 is defined on the mass block 42 and penetrates through the mass block 42. A position, corresponding to the mounting hole 420, of the housing 200 protrudes towards the magnetic circuit system 3 to form a protruding portion 204. The magnetic circuit system 3 is fixed to the housing 200 through the protruding portion 204. Specifically, the main magnetic circuit 32 and the auxiliary magnetic circuit 33 are fixed to the housing 200 through the protruding portion 204, so that the multifunctional sound device 100 is compact in internal structure and good in acoustic effect, a size of the multifunctional sound device 100 is small, and miniaturization application of the multifunctional sound device 100 is facilitated.

The mass block 42 is made of conductive materials. In the embodiment, the mass block 42 is made of conductive materials having high conductivity.

In the embodiment, the mass block 42 is made of copper materials. The mass block 42 made of copper materials has high density, high weight, and is easy to shape. The mass block 42 further has a function of cutting magnetic field lines of the magnetic circuit system 3 and generating electromagnetic damping to prevent the vibration unit 4 from vibrating.

The driving coils 41 interact with the magnetic circuit system 3 to enable the vibration unit 4 to vibrate in a reciprocating mode after the driving coils 41 are energized. The mass block 42 cuts the magnetic field lines of the magnetic circuit system 3 in reciprocating vibration of the vibration unit 4 and generates electromagnetic damping to prevent the vibration unit 4 from vibrating.

That is, a rotor of the motor assembly 400 is actually composed of the driving coils 41 and the mass block 42. The mass block 42 made of copper materials is for configuration, which is beneficial for reducing a volume of the multifunctional sound device 100. When the driving coils 41 are energized, the magnetic circuit system 3 of the sound unit 300 provides driving forces for the driving coils 41, that is, the main magnetic circuit 32 and the auxiliary magnetic circuit 33 provide the driving forces for the driving coils 41 at the same time, so that the magnets serving as stators are not required for the motor assembly, and the multifunctional sound device 100 is small in overall thickness, small in size, and excellent in acoustic performance. Meanwhile, the structure further reduces cost of parts and assembly, and the multifunctional sound device 100 is wide in application.

Working principle of the vibration unit 4 is as following. The main magnetic circuit 32 and the auxiliary magnetic circuit 33 are fixed to the housing 200, and the driving coils

41 are located in the magnetic field range of the main magnetic circuit 32 and the auxiliary magnetic circuit 33 and interact with each other to generate an electromagnetic field. A current direction of the driving coils 41 is controlled to achieve mutual driving force with the main magnetic circuit 32 and the auxiliary magnetic circuit 33. The main magnetic circuit 32 and the auxiliary magnetic circuit 33 are fixed to the housing 200, which is not movable and serve as stators. The driving coils 41 and the mass block 42 are suspended in the housing 200 through the elastic components, which are movable and serve as actuators. Therefore, the main magnetic circuit 32 and the auxiliary magnetic circuit 33 vibrate together with the driving coils 41 and the mass block 42, and the driving coils 41 and the mass block 42 drive the whole vibration unit 4 to vibrate.

Figure 6:
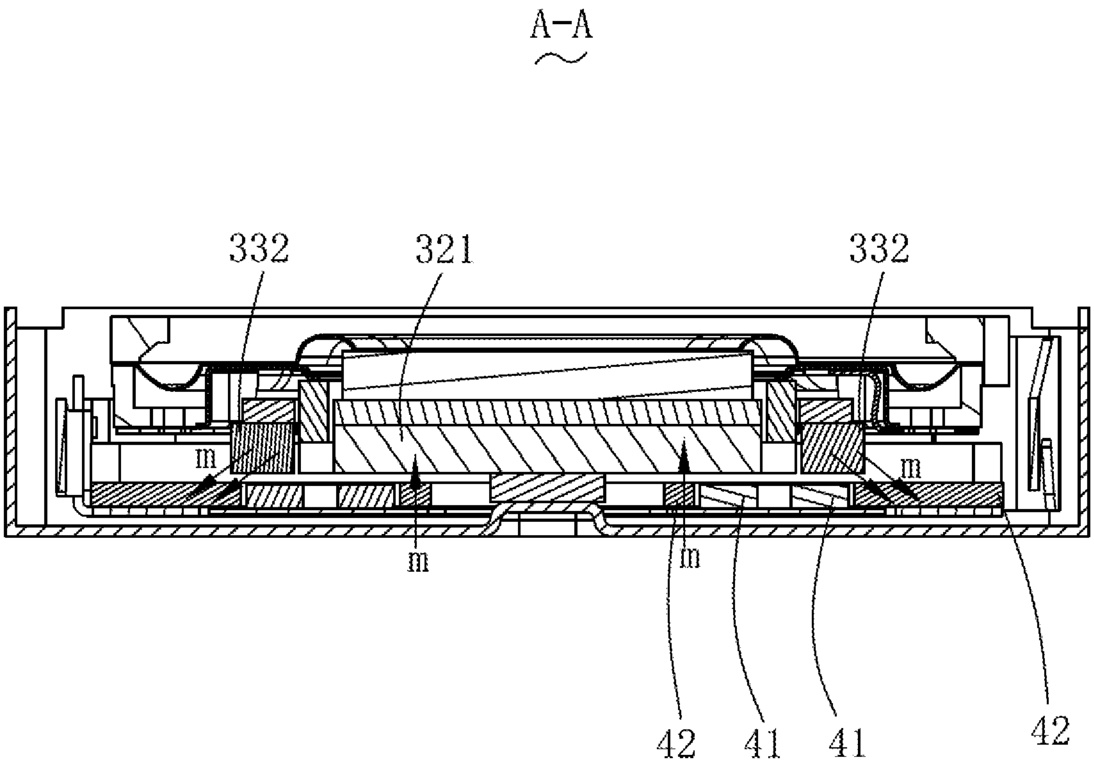
FIG. 6 is a schematic diagram of a distribution of magnetic field lines shown in FIG. 3.

Referring to FIG. 6, reference letter m in FIG. 6 represents the magnetic field lines of the main magnetic circuit 32 and the auxiliary magnetic circuit 33. When the vibration unit 4 vibrates, the magnetic field lines m pass through high-conductivity materials to form the mass block 42, and when the mass block 42 moves, the magnetic field lines m are cut to generate the large electromagnetic damping. The structure optimizes damping modes, and the electromagnetic damping generated by the mass block 42 is large, so that the vibration effect of the motor assembly 400 is good.

In the embodiment, the mass block 42 includes a mass block body 421 and counterweight portions 422. The counterweight portions 422 extend from the mass block body 421 to a direction of the magnetic circuit system 3. The two driving coils 41 are respectively fixed to the mass block body 421. The counterweight portions 422 include two counterweight portions 422. The two counterweight portions 422 are respectively located on two opposite sides, perpendicular to the vibration direction of the vibration unit 4, of the protruding portion 204. The structure increases configuration and reduces a volume of the mass block 42.

In the embodiment, the mounting hole 420 is located in a center of the mass block body 421. The structure ensures good vibration performance of the motor assembly 400.

A first end of each of the elastic components 5 is fixed to the mass block 42. A second end of each of the elastic components 5 is fixed to the housing 200. Specifically, the elastic components 5 are fixed to the side wall 203.

In the embodiment, the elastic components include two elastic components 5. The two elastic components 5 are respectively fixed to two opposite sides of the mass block 42 along the vibration direction of the vibration unit 4.

The front cover 500 is fixed to the frame 1. The front cover and the vibrating diaphragm 21 jointly form a front sound cavity 501 configured to generate sound. A through hole 502 is defined on the front cover 500 and penetrates through the front cover 500. The front sound cavity 501 is communicated with outside through the through hole 502.

The supporting frame 600 is disposed between the protruding portion 204 and the magnetic circuit system 3.

The main magnetic circuit 32 and the auxiliary magnetic circuit 33 are both fixed to the supporting frame 600.

The magnetic circuit system 3 is fixed to the housing 200 by sequentially passing through the supporting frame 600 and the protruding portion 204. The structure reduces a volume of the sound unit 300, makes the multifunctional sound device 100 compact in internal structure and good in acoustic effect, so that the size of the multifunctional sound device 100 is small, and the miniaturization application of the multifunctional sound device 100 is facilitated.

Compared with related art, the multifunctional sound device of the present invention includes the housing, the sound unit, and the motor assembly. The housing includes the accommodating space. The sound unit and the motor assembly are accommodated in the accommodating space. The multifunctional sound device of the present invention is provided with the magnetic circuit system through the sound unit. The motor assembly includes a vibration unit and elastic components. The vibration unit is disposed on one side, distal from the vibration system, of the magnetic circuit system. The elastic components suspend the vibration unit in the accommodating space. The vibration unit includes driving coils and a mass block. The driving coils are fixed to the mass block and located in a magnetic field range of the magnetic circuit system. When the driving coils are energized, the magnetic circuit system of the sound unit provides driving forces for the driving coils, so that the magnets serving as stators are not required for the motor assembly, and spaces originally for the magnets are now provided for the accommodating space, that is, the sound unit and the motor assembly share one magnetic circuit, so that the multifunctional sound device is small in overall thickness, small in size, and excellent in acoustic performance. Preferably, the mass block is made of conductive materials. The driving coils interact with the magnetic circuit system to enable the vibration unit to vibrate in a reciprocating mode after the driving coils are energized. The mass block cuts magnetic field lines of the magnetic circuit system in reciprocating vibration of the vibration unit and generates electromagnetic damping to prevent the vibration unit from vibrating. The mass block serves as the damping for providing the vibration of the vibration unit, and the electromagnetic damping of the magnetic circuit provides a larger damping compared to the damping in the related art, which optimizes methods of providing damping, saves a volume, and is easy to assemble the multifunctional sound device. Meanwhile, the structure further reduces cost of parts and assembly, and the multifunctional sound device is excellent in the acoustic performance and wide in application.

The above are only the embodiments of the present invention. It should be noted that, for the person of ordinary skill in the art, improvements are made without departing from concepts of the present invention, but these are all within the protection scope of the present invention.

What is claimed is:

1. A multifunctional sound device, comprising:

a housing;

a sound unit; and a motor assembly;

wherein the housing comprises an accommodating space, the sound unit is accommodated in the accommodating space; the sound unit comprises a frame, a vibration system, and a magnetic circuit system; the vibration system and the magnetic circuit system are respectively fixed to the frame, the magnetic circuit system is configured to drive the vibration system to vibrate and generate sound; the magnetic circuit system comprises magnetic gaps;

the motor assembly is accommodated in the accommodating space, the motor assembly comprises a vibration unit and elastic components, the vibration unit is disposed on one side, distal from the vibration system, of the magnetic circuit system; the elastic components suspend the vibration unit in the accommodating space;

the vibration unit comprises driving coils and a mass block;

the driving coils are fixed to the mass block and are located in a magnetic field range of the magnetic circuit system; and the mass block is made of conductive materials, the driving coils interact with the magnetic circuit system to enable the vibration unit to vibrate in a reciprocating mode after the driving coils are energized, and the mass block cuts magnetic field lines of the magnetic circuit system in reciprocating vibration of the vibration unit and generates electromagnetic damping to prevent the vibration unit from vibrating.

2. The multifunctional sound device according to claim 1, wherein the mass block is made of copper materials.

3. The multifunctional sound device according to claim 1, wherein a mounting hole is defined on the mass block and penetrates through the mass block; a position, corresponding to the mounting hole, of the housing protrudes towards the magnetic circuit system to form a protruding portion; and the magnetic circuit system is fixed to the housing through the protruding portion.

4. The multifunctional sound device according to claim 3, wherein the driving coils comprise two driving coils, and the two driving coils are respectively disposed on two opposite sides of the protruding portion along a vibration direction of the vibration unit and correspond to the magnetic gaps.

5. The multifunctional sound device according to claim 4, wherein the mass block comprises a mass block body and two counterweight portions, the two counterweight portions extend from the mass block body to a direction of the magnetic circuit system, the two driving coils are respectively fixed to the mass block body, and the two counterweight portions are respectively located on two opposite sides, perpendicular to the vibration direction of the vibration unit, of the protruding portion.

6. The multifunctional sound device according to claim 4, wherein the multifunctional sound device further comprises a supporting frame, the supporting frame is disposed between the protruding portion and the magnetic circuit system, and the magnetic circuit system is fixed to the housing by sequentially passing through the supporting frame and the protruding portion.

7. The multifunctional sound device according to claim 6, wherein the magnetic circuit system comprises a main magnetic circuit and an auxiliary magnetic circuit, the auxiliary magnetic circuit surrounds the main magnetic circuit and is spaced apart from the main magnetic circuit to form the magnetic gaps, and the main magnetic circuit and the auxiliary magnetic circuit are respectively fixed to the supporting frame; and the main magnetic circuit comprises a first main magnet, a second main magnet, and a main pole core; the second main magnet is stacked and fixed to the first main magnet, the main pole core is stacked and fixed to the second main magnet; the auxiliary magnetic circuit comprises two first auxiliary magnets, two second auxiliary magnets, and an auxiliary pole core; the two first auxiliary magnets are disposed on two opposite first sides of the first main magnet, the two second auxiliary magnets are disposed on two opposite second sides of the first main magnet, the auxiliary pole core is annular and is respectively stacked and fixed to the first auxiliary magnets and the second auxiliary magnets, and a peripheral side of the auxiliary pole core is at least partially fixed to the frame.

8. The multifunctional sound device according to claim 7, wherein the auxiliary pole core comprises an auxiliary pole core body and auxiliary pole core fixing portions, the auxiliary pole core body is annular, and the auxiliary pole core fixing portions extend from the auxiliary pole core body to the housing and are fixed to the frame.

9. The multifunctional sound device according to claim 1, wherein the elastic components comprise two elastic components, and the two elastic components are respectively fixed to two opposite sides of the mass block along a vibration direction of the vibration unit.

10. The multifunctional sound device according to claim 1, wherein the vibration system comprises a vibrating diaphragm, a voice coil, a bracket, and elastic supporting components; the vibrating diaphragm is fixed to the frame, the voice coil is inserted into the magnetic gaps and drives the vibrating diaphragm to vibrate, the bracket is fixed to the vibrating diaphragm, the elastic supporting components are disposed at intervals with the vibrating diaphragm, the voice coil is suspended in the magnetic gaps through the bracket, a first end of each of the elastic supporting components is fixed to the frame, and a second end of each of the elastic supporting components is fixed to the bracket.

* * * * *